United States Patent
Kocks

Patent Number: 6,164,888
Date of Patent: Dec. 26, 2000

[54] SELF-LUBRICATING CAP NUT

[76] Inventor: Leon B. Kocks, 1300 Prairie St., Chaska, Minn. 55318

[21] Appl. No.: 09/303,286

[22] Filed: Apr. 30, 1999

Related U.S. Application Data

[60] Provisional application No. 60/084,146, May 4, 1998.

[51] Int. Cl.$^7$ .............................. F16B 37/00; F16B 37/14
[52] U.S. Cl. ........................... 411/428; 411/429; 411/435
[58] Field of Search ..................................... 411/377, 428, 411/432, 435, 901, 902, 429

[56] References Cited

U.S. PATENT DOCUMENTS

| | | |
|---|---|---|
| 1,852,319 | 4/1932 | Leighton . |
| 2,064,377 | 12/1936 | Gordon . |
| 2,663,213 | 12/1953 | Davidson et al. . |
| 4,842,004 | 6/1989 | Steinman . |
| 5,028,093 | 7/1991 | Nason . |
| 5,273,384 | 12/1993 | Dunbar . |
| 5,553,984 | 9/1996 | Smith ....................................... 411/429 |
| 5,611,653 | 3/1997 | Smith, II et al. . |

FOREIGN PATENT DOCUMENTS 11889 of 1910 United Kingdom ................... 411/435

*Primary Examiner*—Neill Wilson
*Attorney, Agent, or Firm*—Nikolai, Mersereau & Dietz, P.A.

[57] ABSTRACT

A lubricated wing nut device for attaching a cover plate to a container such as on a gravity tee of the type used for closing a discharge hopper of a tank transport vehicle. The lubricated wing nut inhibits corrosion and seizing of the bolt used in securing the cover plate to the container opening. It comprises a cast metal body having a longitudinal bore of a predetermined diameter inwardly from a base end thereof. Fitted into the bore is a stainless steel nut having an internally threaded surface for engaging the threads on a bolt. The longitudinal bore is adapted to be filled with a lubricating grease.

4 Claims, 4 Drawing Sheets

6,164,888

SELF-LUBRICATING CAP NUT

CROSS-REFERENCE TO RELATED APPLICATION

The present application constitutes a utility application for Letters Patent to that certain Provisional Application Ser. No. 60/084,146, filed May 4, 1998 of Leon B. Kocks, entitled "GRAVITY TEE ARRANGEMENT FOR TRUCK TRAILERS HAVING IMPROVED CLAMPING BOLT".

BACKGROUND OF THE INVENTION

I. Field of the Invention

This invention relates generally to the design of a clamping cap nut adapted for use with a gravity tee used on transport trailers carrying dry bulk products, and more particularly to an improved arrangement for releasibly clamping the cover plate or the like to its housing to facilitate release and reclosing of the cover.

II. Discussion of the Prior Art

Horizontal tank style semi-trailers have been used for several years in transporting dry bulk products, such as sugar, flour, grains, animal feed and the like. As shown in FIG. 1, a typical trailer includes an elongated horizontally disposed tank 10 that may typically be divided into a plurality of compartments 12, 14, 16, 18 by internal bulkheads (not shown). Associated with each of the components is an inlet port at the top of the tank 10 through product to be transported may be loaded. After filling, the inlet ports have covers as at 20 secured to them.

Disposed beneath each of the compartments 12, 14, 16, 18 are discharge hoppers 22, 24, 26 and 28. Secured to the bottom of each of these hoppers is a gravity tee assembly 30.

FIG. 2 is an exploded, perspective view of a prior art gravity tee. It is seen to include a tubular member 32 having a radially extending flange 34 surrounding the open upper end thereof. The flange 34 is adapted to be bolted to the underside of the hoppers 22, 24, 26 and 28 shown in FIG. 1. First and second horizontally oriented tubular stubs 36 and 38 extend through apertures, as at 40, formed diametrically through the side wall of the tubular member 32.

Welded or otherwise affixed to the exterior surface of the tubular member 32 are radially projecting wings 42 and 44 that are preferably disposed midway between the tubular stubs 36 and 38 and spaced from one another by 180°. The wings 42 and 44 each terminate in a tubular extension, as at 46 and 48. A removable cover plate member 50 is adapted to be attached so as to cooperate with the lower opened end 52 of the tubular member 32. The cover plate member 50 has first and second ears 54 and 56 on opposite sides thereof, the ear 54 including a slot 58 extending inwardly from one side edge thereof. Formed through the ear 56 is a circular aperture 60.

Affixed to the upper surface of the cover plate member 50, when viewed in FIG. 2, is an elastomeric disk gasket 62 whose diameter is slightly larger than the outside diameter of the tubular member 32. The gasket is held in place by a bolt 64 that passes through a center hole in a retainer disk 66, through a center hole in the elastomeric disk 62 and then through a center hole in the cover 50. A nut 68 is applied to the bolt 64 to hold these parts together.

To secure the cover plate 50 to the undersurface of the tubular member 32, a first carriage bolt 70 is inserted through the aperture 60 in the ear 56 of the cover plate and thence through the tubular extension 48 on the wing member 44. A washer 72 may then fit over the bolt 70 and a wing nut 74 is screwed on to the threads of the bolt 70 and may be used to draw the cover plate 50 up against the open undersurface of the tubular member 32 with gasket 62 serving as a seal.

In a similar fashion, a carriage bolt 76 is inserted through the tubular extension 46 on the wing 42 and again a washer 78 and a wing nut 80 are threaded on to the carriage bolt 76. Before the head 82 of the carriage bolt 76 is drawn up tight against the lower end of the tubular extension 46, the cover plate 50 is rotated until the notch 58 formed in the ear 54 engages the unthreaded portion of the carriage bolt 76. Now, when the thumb screw 80 is tightened down against the washer 78, the cover plate 50 will be tightly secured to the undersurface of the tubular member 32 preventing any leakage of product therethrough.

Referring again to FIG. 1, four inch diameter tubular pipes 84, 86, 88, 90 and 92 connect the tubular stubs 36 and 38 of each of the gravity tees in series to form a continuous conduit. When it is desired to unload a compartment 12, 14, 16 or 18, a handle (not shown) coupled to a butterfly style valve (not shown) contained within each of the hoppers is opened so as to permit the contents of the particular component to flow into and fill the gravity tee associated with it. The hose 84 is pressurized with air causing the contents to be blown through the tube segments 86, 88, 90 and 92 from the truck into a storage bin or silo. Once each of the compartments has been emptied and it is desired to clean out the interior of the tank 10, the covers 20 will be opened. Water is then made to flow into the inlets at the top of each of the compartments and this water can exit the bottoms of each of the gravity tees once the cover plates 50 are opened.

A problem exists with the prior art gravity tee heretofore explained. During over-the-road travel, dirt and debris tends to accumulate on the bolts 70 and 76 making it difficult to loosen the wing nuts 74 and 80 when it is desired to rotate the cover plate 50 from its covering position relative to the undersurface of the tubular member 32. Often times, the driver must crawl under the vehicle and use a wrench or the like to loosen the wing nuts 74 and 80 to permit opening of the cover plates 50. This is dirty and time consuming.

A second problem with the prior art gravity tee design is that once the cover plates 50 are loosened and rotated to uncover the open lower end of the tubular member 32, the cover plate 50 will tilt or droop downward to the point where the ear 54 can engage the ground. Should the truck now be moved with the covers opened, the covers, as well as the bolts 70, will be bent and in some instances the tubular extension 48 on the wing 44 can be ripped apart rendering the gravity tee no longer functional. The present invention obviates the above two problems.

SUMMARY OF THE INVENTION

My invention involves substitution of a lubricated cap nuts for prior art wing nuts used to secure a cover plate or the like in place. The cap nut comprises a cast metal cylinder having a longitudinal bore extending inwardly from one end thereof towards its closed opposite end. A grease fitting extends through the closed end of the nut and into the bore. The cap nut is cast about a threaded hex nut proximate the open end of the bore. The hex nut is of a size matching the bolt 76 and is of lesser diameter than the bore.

By injecting grease through the grease fitting in the top of the cap nut, the portion of the bolt received into the bore of the cap nut will remain lubricated, thereby preventing the cap nut from seizing to the bolt due to rust or the like.

DESCRIPTION OF THE DRAWINGS

The foregoing features, objects and advantages of the invention will become apparent to those skilled in the art from the following detailed description of the preferred embodiment, especially when considered in conjunction with the accompanying drawing in which like numerals in the several views refer to corresponding parts.

DESCRIPTION OF THE PREFERRED EMBODIMENT

Figure 1:
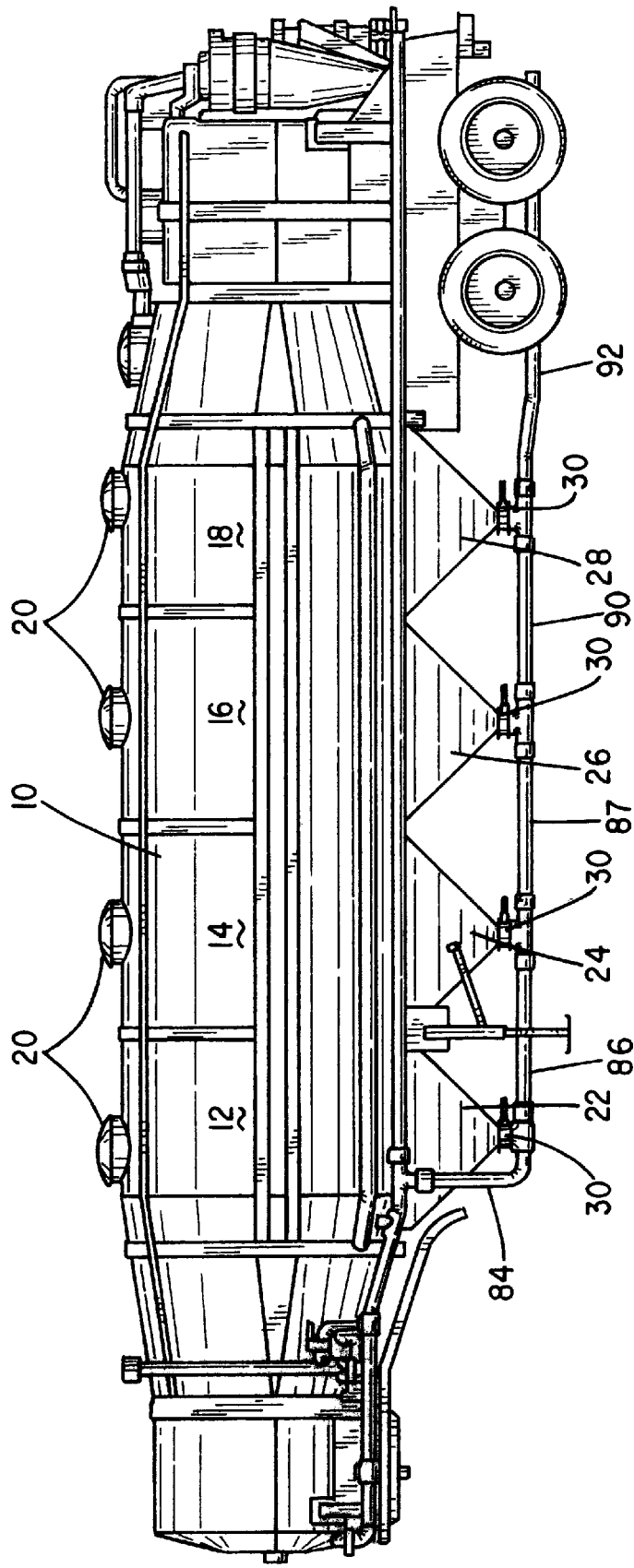
FIG. 1 is a side elevational view of a prior art transport truck of the type incorporating a gravity tee device with which the present invention finds use.
Figure 2:
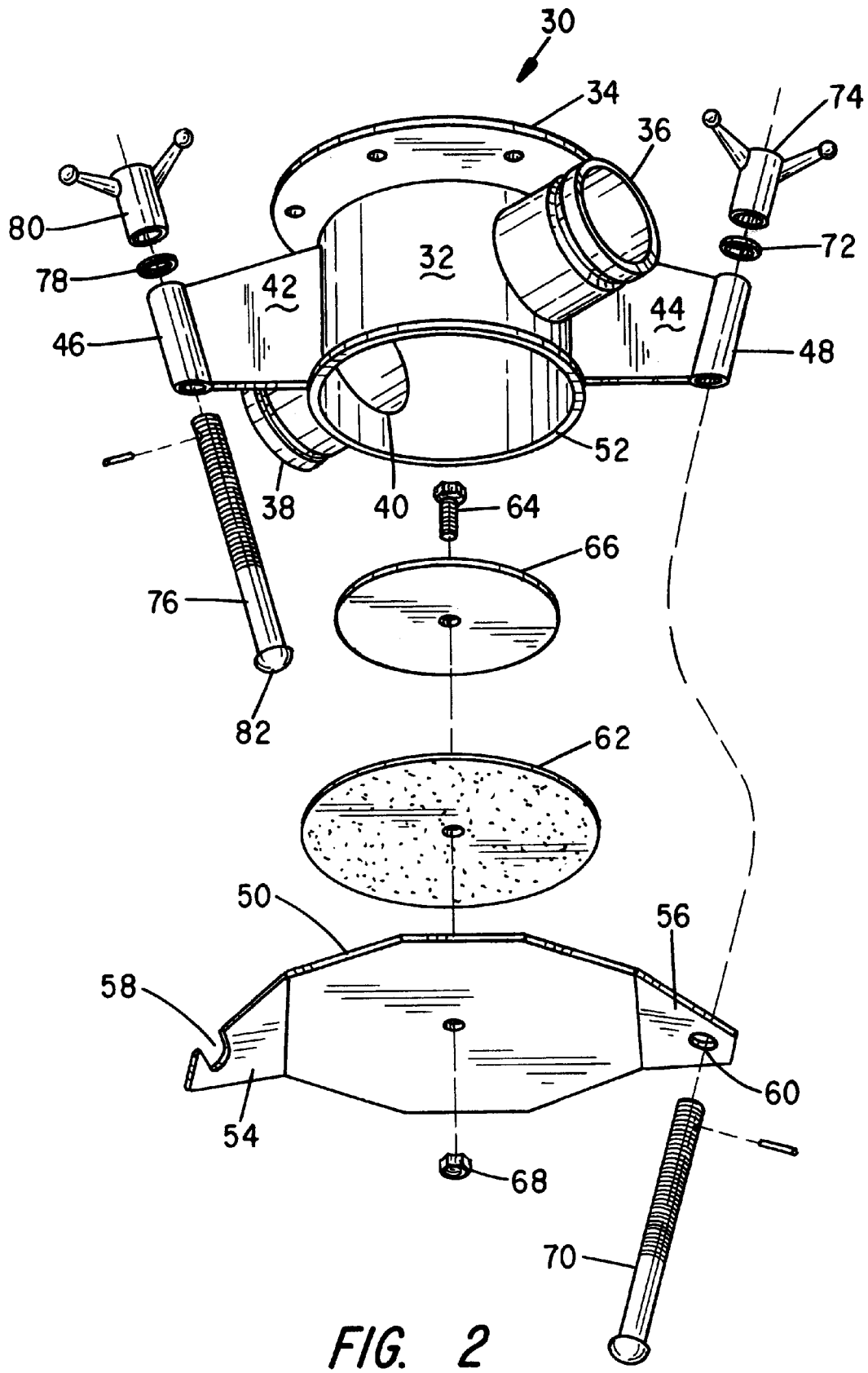
FIG. 2 is an exploded perspective view of the prior art gravity tee.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof and words of similar import.

The present invention is described in a typical application where an access cover that is exposed to the elements is to be releasably secured to a container, such as on the gravity tee of a transport truck. However, it is to be understood that the lubricated cap nut may find wider application so that limitation to use on a gravity tee is not to be inferred.

Figure 3:
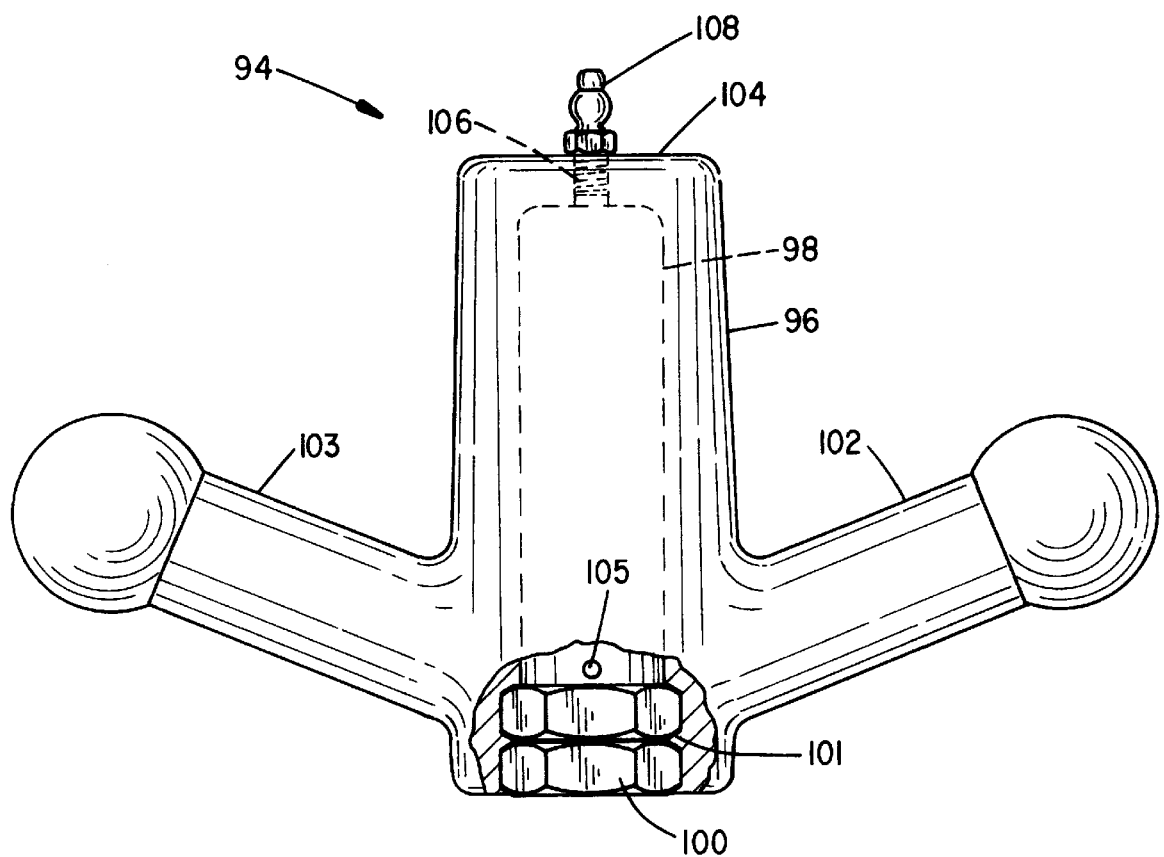
FIG. 3 is a partial cross-sectional view of the lubricated cap nut of the present invention.

Referring to FIG. 3, there is shown a partially sectioned view of the lubricated cap screw 94 of the present invention. The cap screw is seen to comprise a cylindrical casting 96 made of a suitable metal, preferably aluminum. It includes a central bore 98 having a diameter greater than that of the clamping bolt 76 with which it may be used (see FIG. 4). Fitting into the mold at the time of casting the cap nut cylinder 96 is a hex nut 100 whose threads match those on the bolt 76. The nut 100 preferably includes an annular groove 101 into which metal may flow as the cap portion is being cast. In this way, the cap portion 96 becomes securely attached to the nut 100.

To facilitate rotation of the cap nut 94 onto the bolt 76, there are provided transversely extending arms 102 and 103 that extend radially outward from the body of the cap nut proximate its lower end.

The bore 98 does not extend all the way through the cylinder 96 but, instead, ends short of the top portion 104 of the cap nut 94. A tapered bore 106 extends through the top 104 proximate its center point and fitted into the tapered bore is a conventional Zerk grease fitting 108. A convention grease gun (not shown) can be coupled to the Zerk fitting 108 such that grease under pressure may be injected through the fitting and into the bore 98 to partially fill the bore 98. A breather hole 105 extends through the wall of the casting leading to the bore 98 so that as grease is injected, air can escape to allow the grease to fill the cavity. When the cap nut is advanced on to the bolt 76, it lubricates the mating surfaces of the threads on the hex nut 100 with those on the bolt 76, preventing rusting and seizing thereof.

Figure 4:
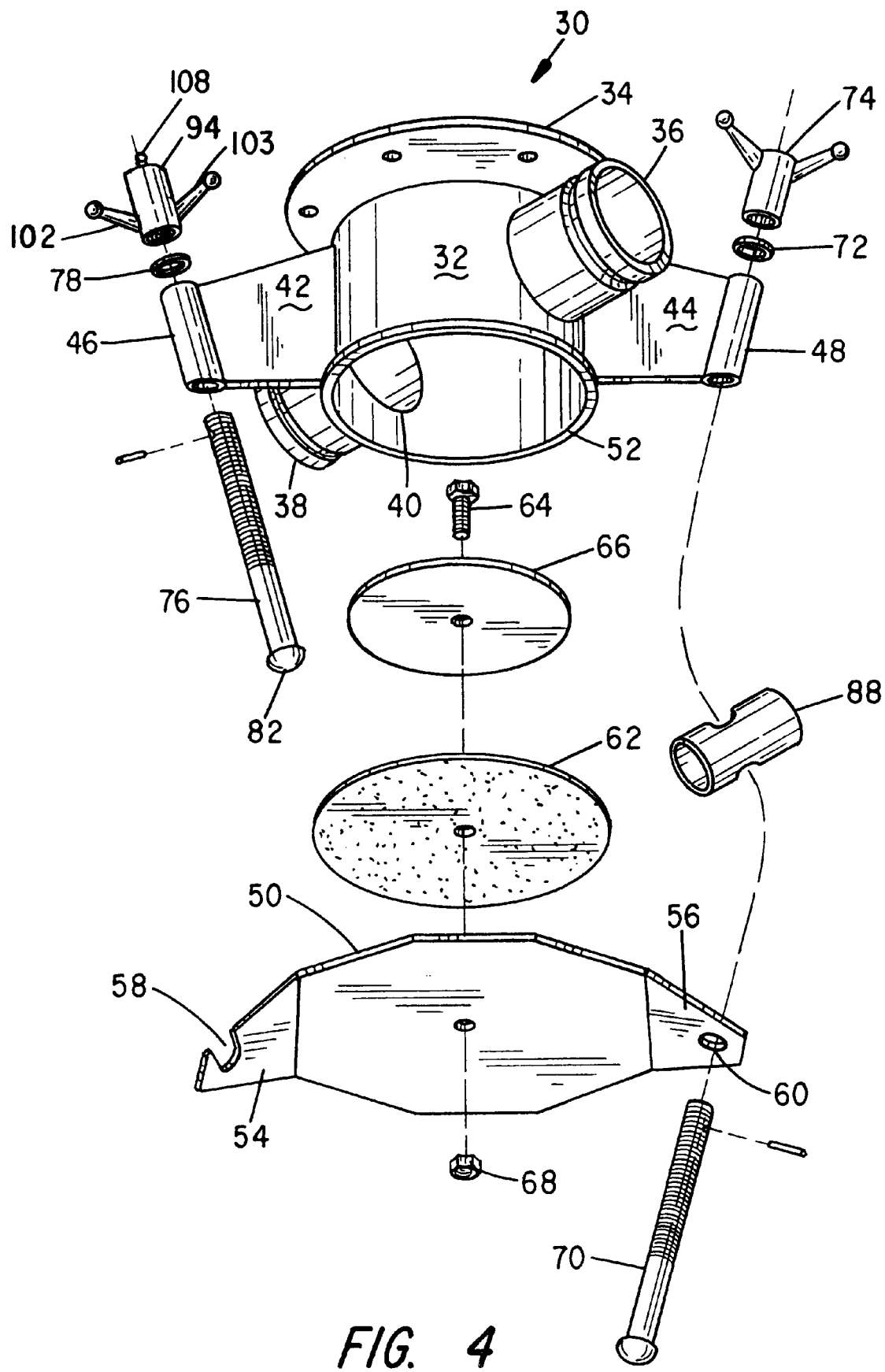
FIG. 4 is an exploded perspective view of a gravity tee incorporating the improvements comprising the present invention.

The length of the cap nut 94 and its internal bore 98 are sufficient to receive the end portion of the bolt 76 on which it is used when the bottom surface 110 thereof is made to press down on the tubular end portion 46 of the projecting ear 42 of the gravity tee of FIG. 4 when the cover plate 50 is abutting the open lower end 52 of the gravity tee. Rotation of the cap nut onto the bolt 76 thus serves to releasibly clamp the cover plate 50 in place.

Because the upper end of the end portion of the bolt 76 is covered with lubricating grease, moisture, corrosive road salt, sand and other debris do not cause the cap nut 94 to "freeze" onto the bolt 76 and it can be readily loosened by hand if earlier only hand-tightened.

While the device of FIG. 3 show the Zerk fitting 108 in the top portion of the cap nut, it is also possible to relocate that fitting to a side wall of the cylinder 96. In fact, the Zerk fitting can be eliminated completely and the cap nut filled with grease via the threaded bore in the nut 100.

The gravity tee incorporating my lubricated clamping nut will also benefit from incorporation of the tubular resilient spring 88 of my provisional patent application Ser. No. 60/077,245, filed Mar. 9, 1998, the substance of which is hereby incorporated by reference into the present application. As is explained in the aforereferenced provisional application, the tubular resilient spring 88 (FIG. 4) is preferably fabricated from PVC tubing and is sufficiently resilient so that the wing nut 74 can be tightened sufficiently to draw the cover plate 50 into contact with the undersurface 52 of the tubular member 32. Now, when the lubricated cap nut 94 is rotated onto the threaded bolt 76, the cover plate will be snugged tightly against the open bottom of the gravity tee with the resilient gasket 62 tightly sealing the opening.

When the lubricated cap nut 94 is loosened, the driver can readily pivot the cover plate 50 about the carriage bolt 70, but the resilient tubular spring 88 placed on the bolt 70 intermediate the ear 56 on the cover plate and the undersurface of the tubular portion 48 of the ear 44 on the gravity tee precludes the cover plate 50 from drooping downward. That is to say, the plate 50 remains in a generally horizontal disposition even when in its rotated, out-of-the-way, disposition relative to the bottom end 52 of the gravity tee.

It can be seen, then, that the present invention offers two advantages. No tools are required to clamp and unclamp the cover plate relative to the gravity tee. Secondly, the cover plate 50 is not permitted to droop due to the action of the resilient tubular spring 88 disposed between the ear 56 and the tubular extension 48. Thus, it cannot be made to dig into the ground and become benched should the driver move his truck before closing and latching the cover plate.

This invention has been described herein in considerable detail in order to comply with the Patent Statutes and to provide those skilled in the art with the information needed to apply the novel principles and to construct and use embodiments of the example as required. However, it is to be understood that the invention can be carried out by specifically different equipment and devices and that various modifications, both as to the equipment details and operating procedures can be accomplished without departing from the scope of the invention itself.

What is claimed is:

1. A cap nut adapted for use on a threaded bolt comprising:
    (a) an elongated cast metal tubular member having an internal lumen with a first open end and a generally closed second end;
    (b) a hex nut cast into the first open end of the tubular member, said hex nut adapted to fit onto a threaded rod whose diameter is less than the diameter of the lumen, the hex nut having an annular groove formed in an exterior surface thereof for interlocking the hex nut with metal tubular member during casting thereof;

(c) at least one wing member extending radially from an exterior surface of the tubular member; and (d) means for introducing a lubricant into the internal lumen.

2. The cap nut of claim 1 wherein the metal comprising the tubular member is aluminum and the hex nut is stainless steel.

3. The cap nut of claim 1 wherein the means for introducing lubricant is Zerk fitting disposed in a bore formed through the tubular member leading to the lumen.

4. The cap nut of claim 3 wherein two wing members extend radially from the exterior surface of the tubular member about 180° apart, said two wing members being inclined at a predetermined angle from a longitudinal axis of the tubular member.

* * * * *